(12) United States Patent
Moore et al.

(10) Patent No.: US 9,536,009 B2
(45) Date of Patent: Jan. 3, 2017

(54) EMBEDDING A REPRESENTATION OF AN ITEM IN A HOST

(75) Inventors: Jason F. Moore, Redmond, WA (US); David Citron, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1895 days.

(21) Appl. No.: 11/835,955

(22) Filed: Aug. 8, 2007

(65) Prior Publication Data

US 2009/0043813 A1  Feb. 12, 2009

(51) Int. Cl.
| | |
|---|---|
| *G06F 17/00* | (2006.01) |
| *G06F 17/30* | (2006.01) |
| *G06F 9/44* | (2006.01) |
| *G06F 3/0484* | (2013.01) |
| *G06F 17/24* | (2006.01) |
| *G06F 3/0481* | (2013.01) |
| *G06F 3/0482* | (2013.01) |
| *G06F 17/21* | (2006.01) |
| *G06F 17/22* | (2006.01) |

(52) U.S. Cl.
CPC ....... *G06F 17/30876* (2013.01); *G06F 3/0481* (2013.01); *G06F 3/0482* (2013.01); *G06F 3/04817* (2013.01); *G06F 3/04842* (2013.01); *G06F 8/30* (2013.01); *G06F 8/34* (2013.01); *G06F 8/38* (2013.01); *G06F 17/212* (2013.01); *G06F 17/2247* (2013.01); *G06F 17/24* (2013.01); *G06F 17/3089* (2013.01)

(58) Field of Classification Search
CPC ...... G06F 3/0482; G06F 17/24; G06F 17/212; G06F 17/2247; G06F 3/0481; G06F 3/04817; G06F 3/04842; G06F 17/3089; G06F 8/30; G06F 8/34; G06F 8/38
USPC ....................................................... 715/255
See application file for complete search history.

(56) References Cited

U.S. PATENT DOCUMENTS

| | | | |
|---|---|---|---|
| 7,069,310 B1 | 6/2006 | Bartholomew | |
| 7,171,472 B2 | 1/2007 | O'Brien et al. | |
| 2002/0133561 A1* | 9/2002 | O'Brien et al. | 709/213 |

(Continued)

OTHER PUBLICATIONS

"Upload Accelerator for Files and Folders," retrieved on Jul. 4, 2007, accessible at <<http://www.xdrive.com/support/online_help/web/uploading_folders.htm>>, 3 pages.

(Continued)

*Primary Examiner* — Nathan Hillery
(74) *Attorney, Agent, or Firm* — Dan Choi; Micky Minhas (57) ABSTRACT

Functionality is described for creating objects that represent respective items provided in a store. The objects can be embedded in various hosts, such as network-accessible pages (e.g., web pages), network-accessible journals (e.g., blogs), messages (e.g., Emails), and so on. Consumers can activate the objects in the hosts to retrieve information associated with the corresponding items. According to one illustrative feature, the functionality provides a general interface for creating objects for different types of items stored in the store, including file items of various kinds (e.g., text files, image files, audio files, spreadsheet files, video files, etc.), list items, folder items, and so on. According to another illustrative feature, the functionality provides an interface for allowing users to customize various aspects of objects.

20 Claims, 9 Drawing Sheets

(56) References Cited

U.S. PATENT DOCUMENTS

| | | | |
|---|---|---|---|
| 2004/0041818 A1* | 3/2004 | White et al. ................ 345/619 |
| 2004/0111415 A1 | 6/2004 | Scardino et al. |
| 2004/0172419 A1 | 9/2004 | Morris et al. |
| 2004/0177159 A1 | 9/2004 | Butterfield et al. |
| 2004/0205604 A1* | 10/2004 | Read ........................... 715/517 |
| 2005/0165849 A1 | 7/2005 | Moradi et al. |
| 2005/0204063 A1* | 9/2005 | O'Brien et al. ............. 709/245 |
| 2005/0289237 A1 | 12/2005 | Matsubara et al. |
| 2006/0101268 A1* | 5/2006 | Cornuejols et al. ......... 713/173 |
| 2006/0106822 A1 | 5/2006 | Lee et al. |
| 2006/0155570 A1 | 7/2006 | Almeida et al. |
| 2006/0248442 A1* | 11/2006 | Rosenstein et al. ......... 715/513 |
| 2006/0265477 A1* | 11/2006 | Bartholomew ............... 709/219 |
| 2007/0035764 A1 | 2/2007 | Aldrich et al. |
| 2007/0038681 A1 | 2/2007 | Pierce et al. |
| 2007/0073840 A1* | 3/2007 | O'Brien et al. ............. 709/217 |
| 2007/0112944 A1* | 5/2007 | Zapata et al. ................ 709/221 |
| 2007/0244976 A1* | 10/2007 | Carroll et al. ................ 709/206 |
| 2008/0109715 A1* | 5/2008 | Stover ........................... 715/237 |
| 2008/0263103 A1* | 10/2008 | McGregor et al. ........... 707/200 |
| 2009/0037515 A1* | 2/2009 | Zapata et al. ................ 709/202 |
| 2009/0070438 A1* | 3/2009 | Bartholomew ............... 709/219 |
| 2010/0016003 A1* | 1/2010 | Shapiro et al. ............... 455/466 |
| 2010/0125651 A1* | 5/2010 | Zapata et al. ................ 709/220 |
| 2010/0125735 A1* | 5/2010 | Zapata et al. ................ 713/170 |
| 2010/0185614 A1* | 7/2010 | O'Brien et al. ............. 707/736 |

OTHER PUBLICATIONS

"Uploading Files to bigVAULT," retrieved on Jul. 4, 2007, accessible at <<http://www.bigvault.com/defaulthome/vault/vault-help/upload-help.asp>>, 1 page.

"Uploading Video," retrieved on Jul. 4, 2007, accessible at <<http://tutorials.photobucket.com/tutorial_8.html>>, Photobucket Inc., copyright 2003-2007, 3 pages.

* cited by examiner

OBJECTS FOR DIFFERENT KINDS OF ITEMS

FIG. 4

INTERACTIVE OBJECT

EMBEDDING A REPRESENTATION OF AN ITEM IN A HOST

BACKGROUND

The industry currently provides tools for allowing users to upload files to network-accessible sites for storage. For example, a user may upload digital photographs to a site that is specifically devoted to image storage. If the user designates the photographs as public, any other user can retrieve the photographs from the site. Some sites also allow the user to insert a link to a site-stored file in a network-accessible host (e.g., a web page, a blog, etc.). A consumer of that host can then retrieve the file by activating the link within the host.

Systems which accommodate the above-described type of linking operation are specifically adapted for particular types of files. For example, a video site may provide a special interface for storing and linking to video files. This approach may present various difficulties, as a user who wishes to create a host that makes reference to different types of items may be forced interact with the idiosyncratic interfaces employed by multiple different types of sites.

SUMMARY

Functionality is described for creating custom objects that represent respective items provided in a store or elsewhere. Users can embed the objects in various hosts. Representative types of hosts include network-accessible pages (e.g., web pages), network-accessible journals (e.g., blogs), messages (e.g., Emails), and so on. Consumers can activate the objects in the hosts to retrieve information associated with the corresponding items (including the items themselves and supplemental information associated with the items). According to one illustrative feature, the functionality provides a generic interface for creating objects for different types of items provided in the store or elsewhere. Representative types of items include various kinds of files (e.g., text files, image files, audio files, spreadsheet files, video files, etc.), list items, folder items, and so on.

According to another illustrative feature, the functionality provides an interface for allowing users to customize various aspects of the objects. For instance, a user can customize the visual aspects of the objects, the metadata associated with the objects, the interactive behavior of the objects, and so on. This customization feature allows users to optimally tailor the objects for different hosting environments in which the objects will appear.

Additional illustrative features are described in the following Detail Description section.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a flexible approach that allows users to create objects which represent different types of items. The approach is also flexible because it gives the user several options for customizing objects to suit different intended host environments. The approach can be implemented by various systems, apparatuses, modules, methods, computer-readable media, data structures, and other forms.

This disclosure includes the following sections. Section A describes an illustrative system for creating and utilizing objects. Section B describes illustrative procedures that explain the operation of the system of Section A.

A. Illustrative System

As a preliminary note, any of the functions described with reference to the figures can be implemented using software, firmware, hardware (e.g., fixed logic circuitry), manual processing, or a combination of these implementations. The term "logic," "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of System

Figure 1:
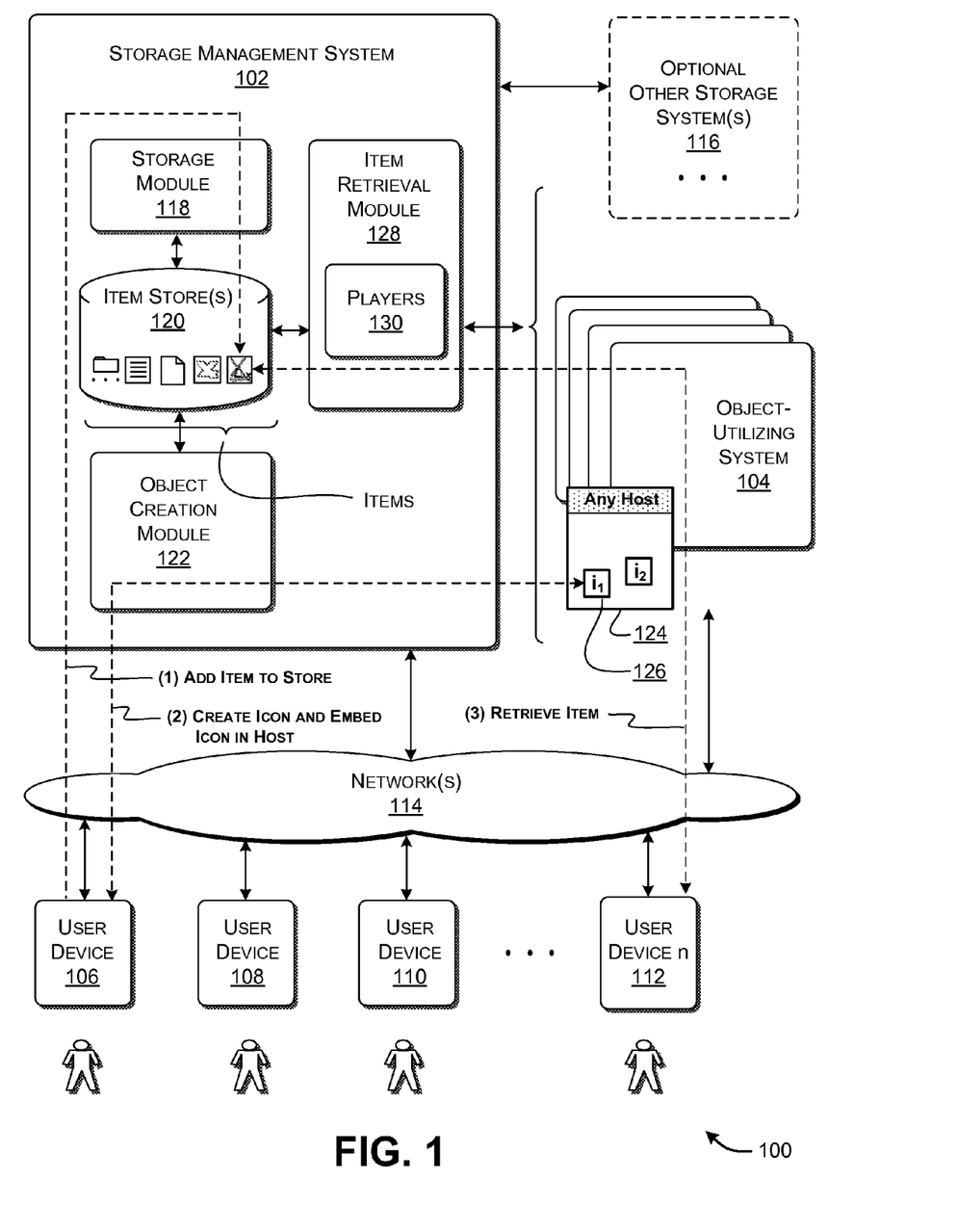
FIG. 1 shows an overview of an illustrative system for creating and utilizing objects, where the objects represent different types of items.

FIG. 1 shows an overview of a system 100 for creating and utilizing objects. The objects represent items. The objects can be embedded in various types of hosts. The items can be activated within the hosts to retrieve information regarding the items associated with the objects.

As to terminology, the term "item" represents any information that can be stored. One type of an item is a file item. Representative types of file items include text files (e.g., files created by a word processing program), audio files, video files, spreadsheet files, graphics files (e.g., files created by a drawing program), and so on. Another type of item is a list item. A list item refers to collection of entries, such as a list of user contacts. In some cases, the entries in the list can be linked together in any manner. Another type of item is a calendar item. A calendar item refers to information associated with a time and/or date. Another type of item is a folder item. A folder item refers to a collection of component items. The component items may include file items of different types. For example, a folder item may include one or more image files, one or more audio files, one or more text files, and so on. The above examples are non-exhaustive; the term "item" can refer to yet other kinds of information.

An "object" refers to any type of representation of an item. In one case, an object may refer to an icon associated with the item. The icon is operative as a control. Namely, the icon is operative to initiate access to information regarding the item when the user activates the icon (e.g., by clicking on the icon or by performing some other action which affects the icon). The icon can impart any combination of image information, text information, audio information, video information, and so on. In one illustrative and non-limiting case, the object can be created using a markup language, e.g., by the HyperText Markup Language (HTML).

The term "host" refers to any type of hosting context in which the object can appear. Representative types of hosts include network-accessible pages and the like (e.g., web pages), network-accessible journals and the like (e.g., blogs), Email messages, instant messenger (IM) messages, documents of any type, a functional module (e.g., a "widget"), and so on. In one illustrative case, the host is expressed by markup language content, such as HTML. A user can "insert" or "embed" an object into this kind of host by inserting an HTML representation of the object into the HTML content of the host at an appropriate location.

The term "user" refers any individual or other entity which stores an item and/or creates an object that represents the object. (In one case, the same user can store an item and then create an object that represents the item. In another case, a first user can store the item and a second user can create an object that represents the item.) The term "consumer" refers to any individual or entity which reads (or otherwise consumes) a host that includes an object. The consumer can retrieve the item by activating the object, e.g., by clicking on the object or otherwise performing a triggering action that affects the object. The terms "user" (as representing a person who creates an object) and a "consumer" (as representing a person who activates a created object) is merely a labeling convention of convenience to facilitate explanation. These terms do not imply limitations regarding the individuals or other entities which may interact with the system 100; for example, a user who creates an object can also serve the role of a consumer by activating this object as it appears within a host.

The system 100 includes two main components: a storage management system 102 and an object management system 104. The purpose of the storage management system 102 is to store items and to allow users to create objects which represent the objects. The purpose of the object-utilizing system 104 is to provide one or more objects in the context of a host. As mentioned above, a host may include a network-accessible page, a network-accessible journal, a message, and so on. As represented in FIG. 1 (by the stacked plurality of module boxes underlying the box labeled "object-utilizing system 104"), the system 100 can provide a plurality of object-utilizing systems. In one example, different object-utilizing systems 104 can correspond to different respective web sites having pages in which objects are embedded. To simplify discussion, the object-utilizing system 104 will be referred to mainly in the singular below.

In one implementation, the storage management system 102 and the object-utilizing system 104 are network-accessible resources. For instance, the storage management system 102 can represent one or more server computers, data storage devices, and/or other data processing equipment. The object-utilizing system 104 can likewise represent one or more server computers, data storage devices, and/or other data processing equipment. Users and consumers can interact with these resources using user devices (106, 108, 110, . . . 112) via a network 114. Each user device can correspond to any kind of electronic processing device, such as a personal computer, a laptop computer, a personal digital assistant (PDA), a game console device, a set-top box associated with a television unit, and so forth. The network 114 can represent a local area network (LAN), a wide area network (WAN) (e.g., the Internet), or some combination of LAN(s) and WAN(s). The network 114 can be implemented by any combination of wireless links, hardwired links, routers, gateways, name servers, and so forth (not shown), and can be governed by any protocol or combination of protocols.

In another implementation, various aspects of the storage management system 102 can be shared by other entities. For example, in one alternative case, the storage management system 102 can rely on another storage system (e.g., storage system 116) to store all or part of the items. In this context, the storage management system 102 can act as a central administrator in managing a collection of items that may be provided in distributed fashion by one or more other sites.

In another implementation, one or more functions performed by the storage management system 102 and the object-utilizing system 104 can be performed locally by the user devices (106, 108, 110, . . . 112). For instance, in one case, some of the items can be locally stored by one or more user devices (106, 108, 110, . . . 112). In this example, an item can be transferred from one user device to another user device in peer-to-peer (P2P) fashion.

In another example of local implementation, the object-utilizing system 104 can correspond to functionality that is locally provided by a user device. For instance, a user can employ the services of the storage management system 102 to create an object that represents an item. The user can then embed this object in a locally-maintained document (where this document serves the role of a host). The user can retrieve the item by activating the object in the document. The user can also send the document to one or more other users (e.g., via Email, file transfer, and the like), allowing these other users to retrieve the item by activating the object. Thus, in this example, the host is a locally-maintained document, rather than a network-accessible resource (such as a web page or a blog, etc.).

With the above introduction, it is now possible to delve further into the functionality employed by the storage management system 102 and the object utilizing system 104, keeping in mind that the following discussion pertains to only one representative example.

The storage management system 102 includes a plurality of modules that perform different functions. A storage module 118 performs the role of storing items in an item store 120. For instance, the storage module 118 can provide a user interface that allows a user to upload items of any type for storage in the item store 120. The storage module 118 can also store metadata associated with the item. Some of the metadata may correspond to pre-existing supplemental information that accompanies the item at the time of storage (such as date-of-creation information, file size information, and so forth). The storage module 118 can allow the user to manually specify other metadata (such as title information, and so forth). The storage module 11 8 can also automatically create metadata associated with the item (such as date-of-uploading information, and so forth).

The item store 120 can pertain to one or more storage devices. In the case that different storage modules are used, these modules can be co-located at a single site or distributed over plural sites. Further, as mentioned above, items can be stored locally by one or more user devices (106, 108, 110, . . . 112). The storage module 118 can apply any type of data management functionality for storing, indexing, and retrieving items. As graphically illustrated in FIG. 1, the storage module 118 and the item store 120 can store items of different types, such as various types of files (text files, image files, video files, etc.), list items, folder items, and so on.

The storage management system 102 also includes an object creation module 122. The purpose of the object creation module 122 is to create an object (e.g., an icon) that represents an item. The object serves as a control for later accessing the item. The following explanation describes various ways that a user can create an object. By way of preview, in one technique, a user can create the object through an item self page. In another case, the user can create the object through an item embed page. In one case, the created object can take the form of markup language content, such as HTML content. The HTML content provides instructions. The instructions enable a browser to render the object.

After the user has created the object, the user can insert or embed the object into a host that is administered by any object-utilizing system, such as the object-utilizing system 104. In one example, the host can represent a page 124 managed by a network-accessible site (associated with one or more server computers, data stores, and so on). In one implementation, the user can embed an object 126 into the page 124 by pasting the HTML associated with the object 126 into the HTML associated with the page 124. As shown in FIG. 1, the illustrative page 124 includes multiple objects (identified symbolically as icons $I_1$ and $I_2$), potentially associated with different respective items.

In one case, the user can access the page 124 by using a user device (e.g., user device 112) to activate a network address associated with the page 124. A browser (not shown) provided by the user device 112 renders the page 124, along with the object 126. The user can activate the object 126 by clicking on the object (with a mouse device) or by interacting with the object 126 in any other way.

An item retrieval module 128 of the storage management system 102 is invoked when the user activates the object 126. The item retrieval module 128 uses address information in the object 126 to access the item that corresponds to the object from the item store 120. The item retrieval module 128 then presents the item to the user. More specifically, generally speaking, the item retrieval module 128 can present information related to the item. In one case, this means that the item retrieval module 128 retrieves and presents the item itself. For example, in the case in which the object 126 corresponds to an image file, the item retrieval module 128 can retrieve and present a depiction of the image itself. In another case, the item retrieval module 128 can present, either instead of the item itself or in addition to the item itself, supplemental information regarding the item. For example, the item retrieval module 128 can access an item self page. The item self page can present the item itself as well as supplemental fields of information, such as various attribute-related metadata associated with the item, various tags associated with the item, various comments entered by consumers regarding the item, and so forth.

As noted above, the item store 120 can provide different types of items. Therefore, any host can include one or more objects that makes reference to various types of items. To accommodate this versatility, the item retrieval module 128 can include a plurality of players 130. The players 130 are configured to present different respective types of items. For example, a video player can be used to present a video item when a linked object is activated, an audio player can be used to present an audio item when a linked object is activated, and so on.

In the above explanation, a consumer's activation of an object causes the item retrieval module 128 to retrieve the item from the item store 120. Other implementations can provide an item to a consumer in different respective ways. For example, a host (such as a web page, blog, etc.) can store an object as well as the item that the object represents. The host that is delivered therefore already has the as part thereof. In this case, when the consumer activates the object, the user device already has obtained the item and can quickly present it without the need to access the storage management system 102. In another implementation, the item associated with an object may be stored (e.g., cached) with the object-utilizing system 104, a user device, and/or at one or more other locations. For instance, the object-utilizing system 104 can store the item in association with a particular web page or the like. The object-utilizing system 104 can store the item when the object is first embedded in the host and/or at any other point in time (e.g., when a consumer first activates the object in the web page). When a consumer activates the object, the item can be retrieved from cache storage, without accessing the storage management system 102. Generally, when an item is retrieved from an alternative source (rather than item store 120), appropriate players can be accessed to present the item; these players can be implemented by any component within the system 100, such as by the object-utilizing system 104, a user device, etc.

Pulling the item from an alternative source (rather than the item store 120) may afford various benefits. According to one advantage, the item can potentially be retrieved more quickly and/or reliably from an alternative source compared to the item store 120. According to another advantage, by pulling the item from an alternative source, the item can be made available in circumstances in which the item store 120 is not accessible for any reason. Indeed, in some cases, a user device can access an item when it is operating offline.

A series of numbered operations summarize the above-described functions of the system 100. In operation (1), a user operates user device 106 (which is an arbitrarily-selected device for explanation purposes) to access the storage management system 102 to store one or more items in the item store 120. In operation (2), the same user (or a different user) can use the user device 106 (or another user device) to create an object for one or more objects that he or she has previously uploaded to the item store 120. (Note that alternative implementations described above accommodate for different ways of storing and accessing items). In operation (3), a consumer uses user device 112 (which is an arbitrarily-selected device for explanation purposes) to access the object-utilizing system 104 to retrieve the page 124. The user can activate the object 126 in the page 124 to retrieve the item associated with the object 126 (and/or to retrieve supplemental information about the item). An appropriate player 130 in the item retrieval module 128 is invoked to present the item to the consumer.

Since the storage management system 102 can store items of different types and create objects associated with these items, a user can regard the storage management system 102 as a "one-stop" site for creating links to content. This benefits the user because the user is not forced to learn how to use different interfaces provided by different sites. While a single site, the storage management system 102 is also versatile because it allows a user to customize the objects to suit the unique aspects of the items being represented and/or the unique hosting environments in which the objects will be inserted. The customization features of the storage management system 102 are described more fully in the next subsection.

This "one-stop" aspect also benefits the administrator (e.g., the owner) of the storage management system 102 by potentially increasing the traffic to its site, particularly if customers begin to associate the site as a preferred tool for handling any linking task. The administrator can financially benefit from this increased traffic in the scenario in which it charges for its services (but in another case, there is no fee for its services, or there is no fee for the use of its services up to a certain amount of use). Alternatively, or in addition, the administrator can leverage the increased traffic for advertising purposes or to offer other of its services to users.

There are still other advantages of the storage management system 102.

A.2. Functionality for Creating an Object

FIGS. 2-7 provide additional information regarding the operation of the object creation module 122. The purpose of the object creation module 122 is to create an object that represents an item. As identified above, there are at least two ways to create an object: using an item self page; and using an item embed page.

Figure 2:
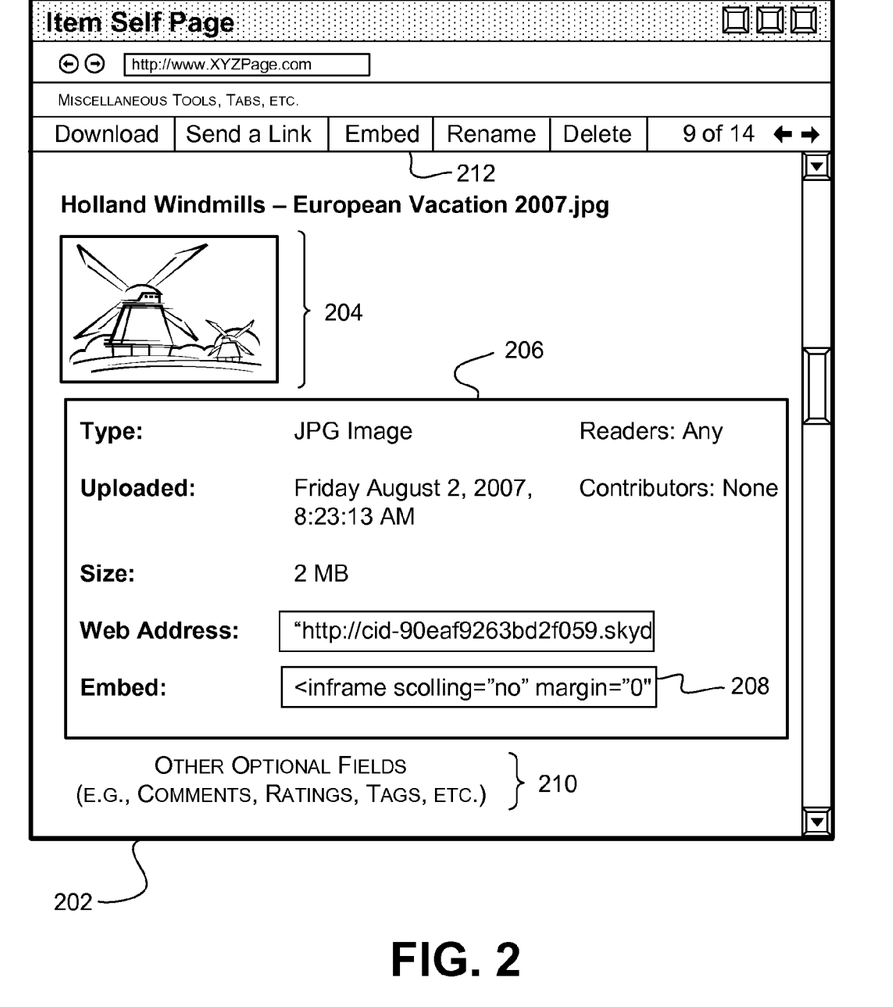
FIG. 2 shows an illustrative item self page through which a user may create an object associated with an item, e.g., by copying embedding information provided on the page.

FIG. 2 shows an illustrative item self-page 202. In this example, the item is an image file corresponding to a digital photograph entitled "Holland Windmills—European Vacation 2007." The item self page 202 can include a field 204 that provides a rendition of the item itself 204. In this case, the rendition may provide a full-scale version or reduced-scale version of the item itself. In another case, the rendition may provide an icon that represents the item, such as a generic picture or graphic that symbolically identifies the item as an image item.

The item self page 202 includes one or more fields of supplemental information associated with the item. One such supplemental field 206 provides various attribute-related metadata associated with the item. Namely, this field 206 may provide information that describes the type of the item, the time at which the item was uploaded for storage, the size of the item, the network address of the item, and so on. The field 206 can also include "embedding information" 208 to be described below. Another supplemental field 210 provides comments pertaining to the item, various tags associated with the item, and so forth. Consumers can enter this information in field 210.

The item self page 208 can create an object associated with the item by providing the embedding information 208. The user can copy the embedding information 208 and then paste this information into a host of choice (e.g., a web page, a blog, etc.). The embedding information 208 provides instructions for a browser or other rendering functionality to display the object within the context of the host. In one case, the embedding information 208 can be formed by HTML markup information. The visual appearance and behavioral characteristics of the object are dictated by the HTML information. Because the item self page 202 presents only a single option regarding the manner in which the object is presented, the item self page 202 may be regarding as presenting a default version of the object (with the caveat that a user with suitable familiarity with HTML instructions can potentially manually modify the HTML instructions in the embedding information 208 to customize the object in some respects).

Figure 3:
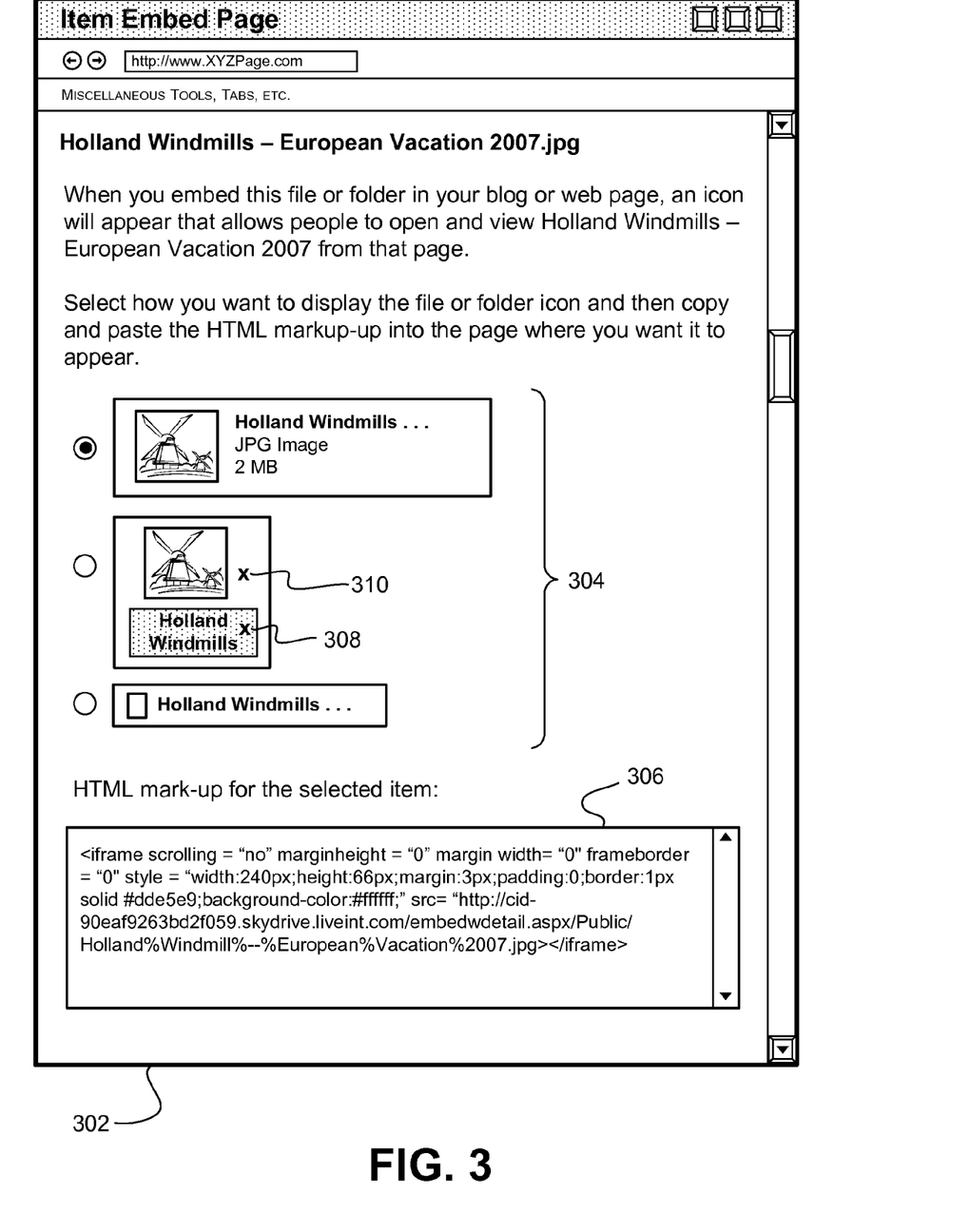
FIG. 3 shows an illustrative item embed page for creating an object associated with an item, where the embed page allows the user to select from among multiple different types of objects to represent the item.

FIG. 3 shows an illustrative item embed page 302 that provides another way for a user to create an object. The user can access the item embed page 302 in various ways, such as by activating an embed command 212 (shown in FIG. 2) in the item self page 202.

Whereas the item self page 202 gives the user only a single option regarding the appearance and other characteristics of the object, the item embed page 302 gives the user multiple options. For example, the item embed page 302 can include a field 304 that presents three options regarding the visual appearance and other characteristics of the object. More specifically, the field 304 presents these options by showing how the object will appear when embedded in a host for three respective options.

A first option provides the most information. For an image file, this option includes a thumbnail presentation of the image item (e.g., a 48×48 pixel thumbnail) and several items of metadata associated with the item. A second option provides a thumbnail presentation of the item, but limits the metadata to only the title of the item. A third option provides a smaller representation of the item (e.g., either a smaller thumbnail of the item compared to the first and second options or a generic icon that only identifies the item as being an image file), together with the title of the item. Although the item embed page 302 presents only three options, the page 302 can include fewer than three options or more than three options.

A user can select one of the multiple options using various selection mechanisms. For instance, the item embed page 302 can provide radio buttons adjacent to the various options, and the user can select an option by clicking on an associated radio button. In the illustrative case of FIG. 3, the user has selected the first option, which provides the most information regarding the item.

In another field, the item embed page 302 includes embedding information 306. Like the case described above for the item self page 202, the embedding information 306 can include markup language instructions that are used by a browser or other rendering functionality to display the object. The embedding information 306 that is displayed by the item embed page 302 corresponds to the option selected by the user in field 304. Thus, the embedding information 306 will change when the user changes his or her selection within the field 304.

Each of the object options in field 304 can include at least two control fields. Consider the second option, which includes a thumbnail representation of the item and the title of the item. Assume that this kind of object is embedded in a host of choice. The title of the item corresponds to a first control field 308. When the user activates the control field 308, the item retrieval module 128 will retrieve and present the image item itself. The remainder of the object corresponds to a second control field 310. When the user activates this control field 310, the item retrieval module 128 will retrieve and present the item self page 202 described in FIG. 2. The item self page 202 may display a depiction of the item as well as supplemental information associated with the item (such as consumer comments, tags, and so forth).

In one application, a user may choose to create different objects that describe the same item. For instance, the user may insert a first type of object in a first web page and another type of object in another page, where both objects ultimately refer back to the same item. This customization feature enables the user to select the look, feel, and behavioral functionality of the object that best suits the item itself and/or the target host environment.

Figure 4:
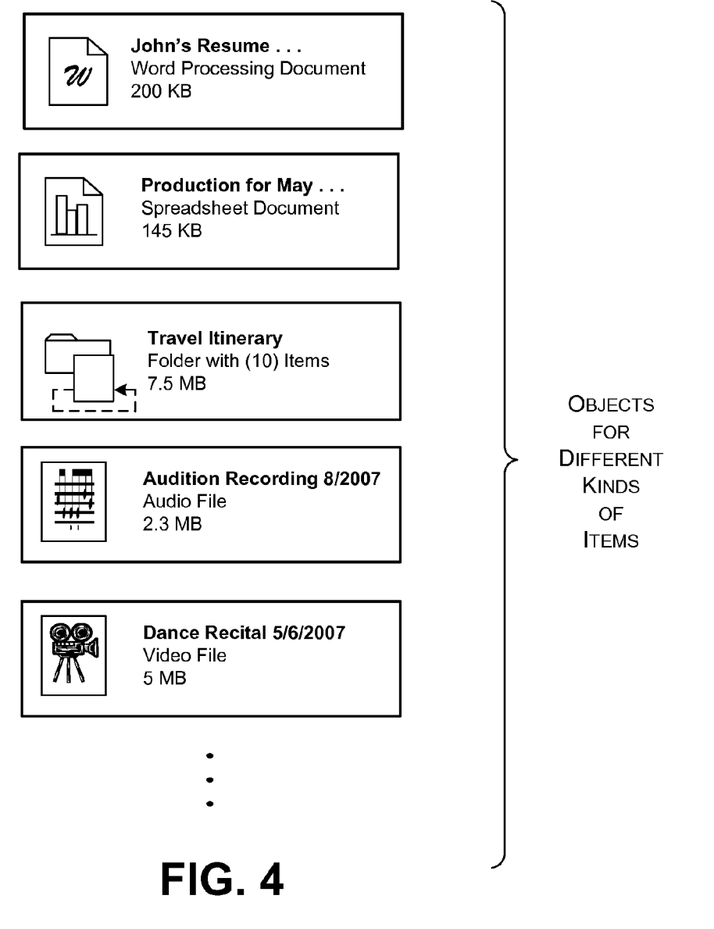
FIG. 4 illustrates a non-exhaustive collection of objects associated with different types of items.

FIG. 3 shows objects associated with an image-type item. More generally, different kinds of objects may be used to represent different types of items. FIG. 4 provides a non-exhaustive sample of different objects that can be used to represent different types of items.

- A first illustrated object can be used to present a text document. This object can include a thumbnail depiction of the document or a generic depiction of the document (that is, a depiction that is the same for all documents). This object may include any combination of metadata associated with the document (or can alternatively omit all metadata).
- A second illustrated object can be used to present a spreadsheet document. This object can include a thumbnail depiction of the document or a generic graphical depiction of the document. This object may include any combination of metadata associated with the document (or can alternatively omit all metadata).
- A third illustrated object can be used to present a folder item. This object can include a thumbnail depiction of the folder's contents or a generic depiction of the folder item. This object may include any combination of metadata associated with the document (or can alternatively omit all metadata). The metadata can pertain to the folder item as a whole and/or to the individual items within the folder item.
- A fourth illustrated object can be used to present an audio item. This object can include a generic depiction of the item. This object may include any combination of metadata associated with the item (or can alternatively omit all metadata).
- A fifth illustrated object can be used to present a video item. This object can include a thumbnail representation of one or more frames of the video item or a generic depiction of the video item. This object may include any combination of metadata associated with the item (or can alternatively omit all metadata).

Other types of objects corresponding to yet additional types of items can be provided.

One or more of the objects shown in FIG. 4 can provide dynamic presentations. For example, the object associated with the folder item can sequence through depictions of the contents of the folder item in the fashion of a slide show, e.g., by displaying a thumbnail depiction of each file in the folder for a few seconds before moving on to the next file. The object associated with the audio item can play a snippet of the audio file in response to various events, such as when the user mouses over the object in a host page. The object associated with the video item can behave in a similar manner by presenting a vignette sample of the video item or by sequencing through certain representative frames of the video item.

Figure 5:
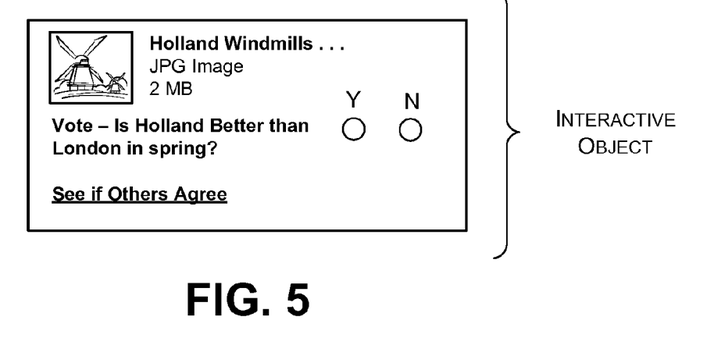
FIG. 5 shows an illustrative object that includes a field which solicits information from a consumer.

FIG. 5 shows an example of an interactive object. The object is interactive in the sense that it solicits input from the user or prompts the user to perform some other action. In the illustrated example, the object corresponds to a picture taken of windmills in Holland. The object presents a thumbnail representation of the item and various metadata associated with the item (title, file type, file size, etc.). The object also includes a prompt which asks a consumer to vote on the topic: "Is Holland better than London in the spring?" (This query, of course, is merely illustrative.) When the user encounters this query in a host page or the like, the user can click on a Yes (Y) or No (N) radio button to enter his or her vote. The user can enter a vote without leaving the host page, e.g., without formally clicking on the object to retrieve the image file itself or its self page. However, the user may also activate the self page or other supplemental page to provide further input regarding the query. For example, the user may activate the item self page to enter a comment related to the query. The object may include a link that provides the results of the voting (e.g., the link with the visual caption "See if Others Agree"). Alternatively, or in addition, the object can provide statistics regarding the outcome of the voting without requiring the user to access a separate page.

The object can also provide other statistics, such as by revealing how many times users have accessed a particular item associated with an object. This is useful information because it identifies whether the item is popular. Insofar as popular items are correlated with interesting items, the consumer is likely to find the item interesting if it has received a large number of "hits." The object creation module 122 dynamically updates the statistics on a periodic basis or in response to each individual change.

The voting interface shown in FIG. 5 is only one example of interactive controls that can be provided by an object. In another case, the object can allow a user to rank the item, e.g., by selecting the desirability of the item on a specified scale (e.g., a five-star scale, etc.). In another case, an object can allow a user to enter a comment without accessing the item's self page. For example, the object can include a pop-up field or any other mechanism that allows a user to enter a comment.

Figure 6:
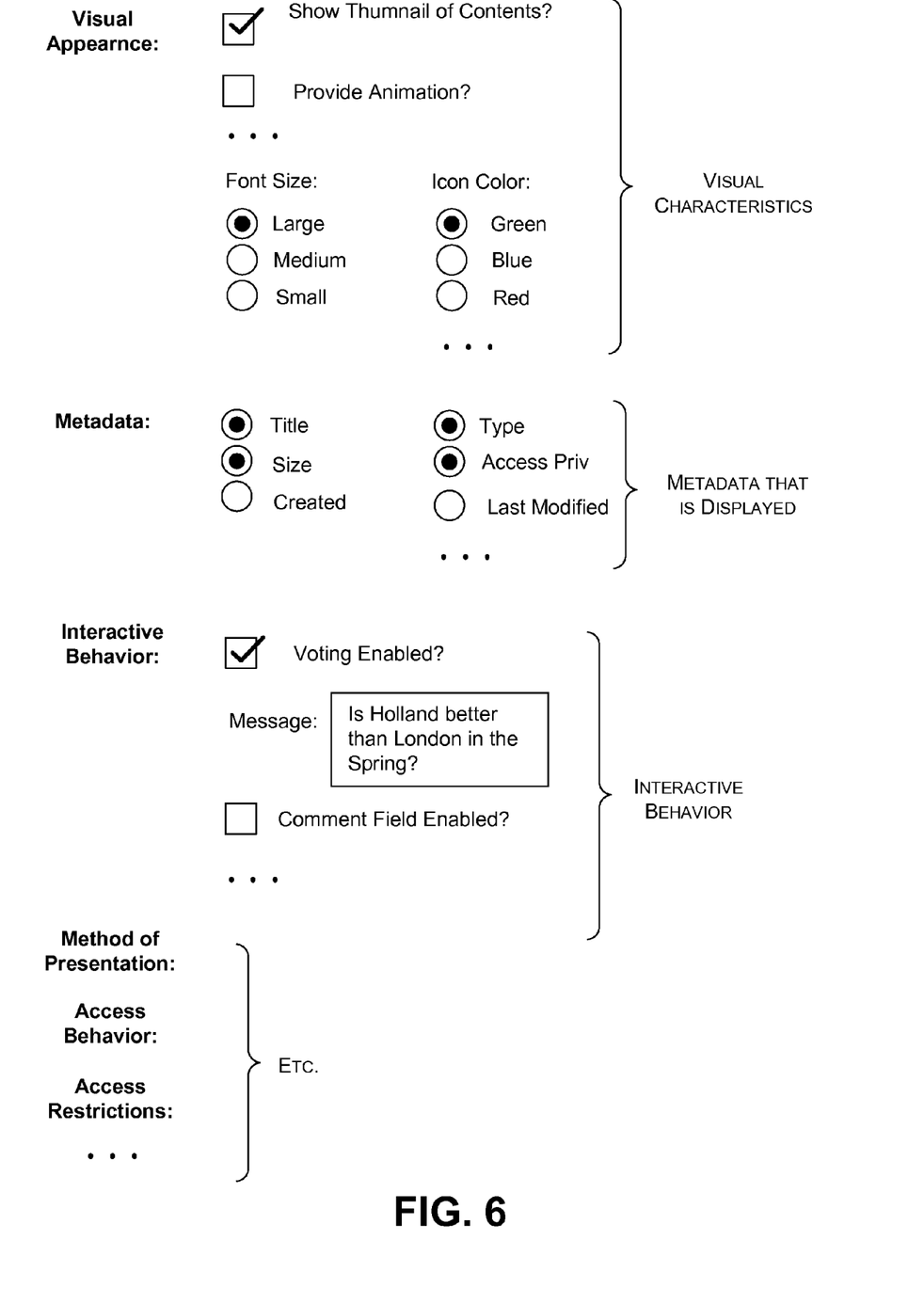
FIG. 6 shows an interface which allows a user to create an object by selecting individual characteristics of the object.

FIG. 6 shows a more fine-grained interface that allows a user to create an object (compared to the discrete pre-generated options available through the item embed page 302). Through the interface of FIG. 6, the user can custom-select individual characteristics of the desired object. The resultant object that is provided is an aggregation of the characteristics selected through this interface.

The characteristics that a user may select can be grouped into various categories. FIG. 6 illustrates these categories using a sequence of check boxes, radio buttons, and the like. However, the object creation module 122 can employ other types of interfaces. For example, the object creation module 122 can collect the user's selections using a wizard-type sequence of input panels. The sequence of the panels can optionally vary depending on the user's selections in previous panels.

A first category of characteristics allows a user to select the visual appearance of the object. According to one illustrative and non-limiting case, the user can specify whether the object will present a thumbnail representation of the item, whether the item will include animation effects (if available, and if so, what type), etc. The user can specify the overall size of the object, the size of the font used by the object, the style of the font, the color of various parts of the object (text, background, etc.), and so forth.

A second category of characteristics allows a user to select the metadata that will be presented with the object. According to one illustrative and non-limiting case, the user can opt to include (or omit) title information, size information, date-created information, date-uploaded information, "last modified" information, item type information, access privilege information, and so on.

A third category of characteristics allows a user to define the optional interactive behavior of the object. According to one illustrative and non-limiting case, the user can opt to include (or omit) controls to receive a consumer's voting input, ranking input, comments, and so on. This category of the interface can also allow a user to specify one or more messages that will be used to prompt the consumer to input information, as in "Is Holland better than London in the spring?"

Still other kinds of characteristics can be specified through the interface. For example, the interface can allow the user to specify the format that is used to create the object (as will be discussed next, e.g., either a full HTML description or a pre-generated image representation, and so on). The interface can also allow the user to select the source from which the item is to be retrieved (for those implementations where the item can potentially be stored in multiple locations). The interface can also allow the user to specify the recipients that are entitled to interact with the item. The interface can specify access privileges in various levels of granularity, e.g., by separately specifying the entities who can access the item, the entities who can contribute to the item, and so on. The interface can allow the user to specify yet other kinds of characteristics of the object.

Figure 7:
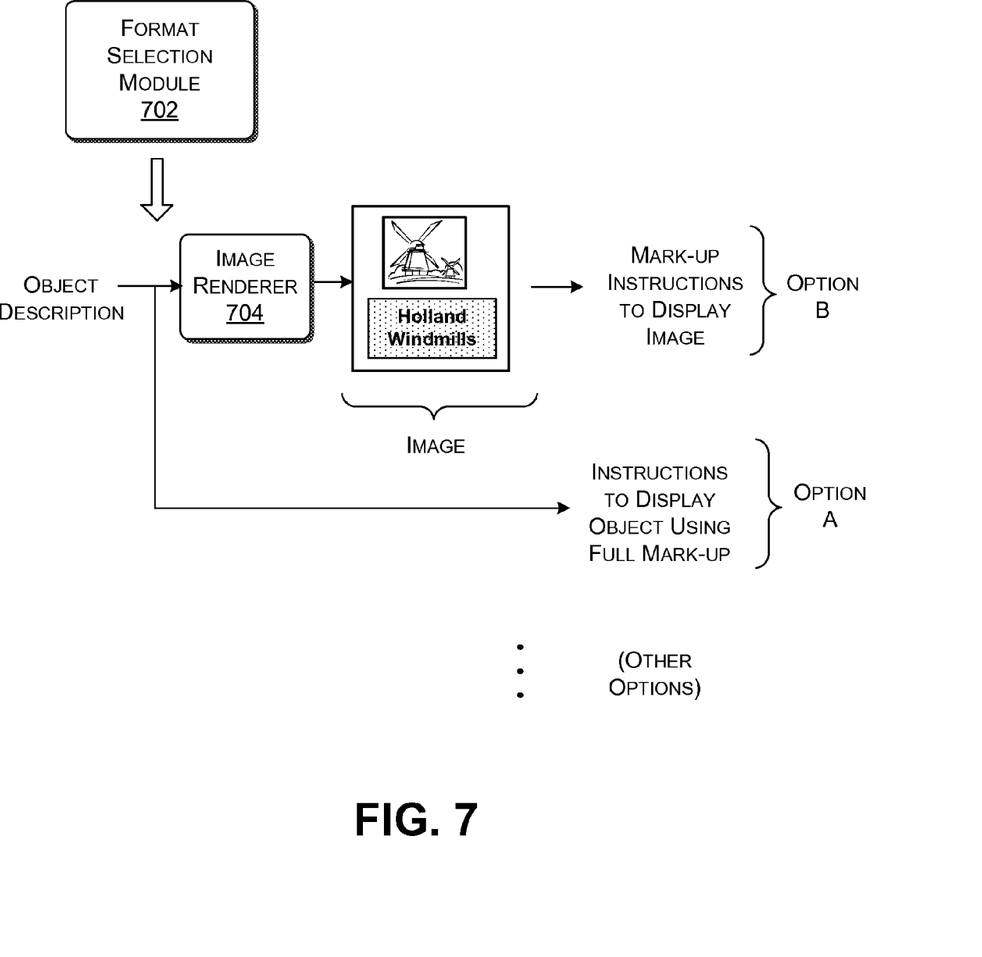
FIG. 7 shows functionality for formatting an object in different ways for consumption by different recipients.

FIG. 7 shows additional details regarding the formation of the object. In one approach, the object creation module 122 can include a format selection module 702. This module 702 can determine the manner in which the object is to be presented for various user devices and/or various consumers.

To provide one example, a first format (option A) provides a full version of the embedding information. One example of this full version of the embedding information is shown in FIG. 3 (e.g., as embedding information 306). The full version of the embedding information corresponds to HTML instructions that allow a browser to construct the object, e.g., by interpreting the instructions.

A second format (option B) is produced by the object creation module 122 using an image renderer 704. The image renderer 704 produces an image of the object by rendering the full version of the HTML instructions. The image renderer 704 saves the image and forms a new HTML expression that simply references the image with appropriate image tags, rather than providing the full version of the HTML instructions. The second format may be desirable for user devices that have limited browser capabilities (e.g., personal digital assistants, etc.). These devices may not be able to interpret all of the instructions in the full version of the HTML instructions. But even smaller user devices of this type are likely to be able to interpret an instruction to display a pre-generated image.

In one case, the format selection module 702 can automatically determine the preferred format that should be used to present the object. The format selection module 702 can make this determination based on knowledge of the user device and/or the consumer that will receive the object. For instance, the user device can pass information to the object creation module 122 which identifies it as having special needs. In another case, an object creator (user) can manually select the format to be used. In another case, a consumer of the object can manually select the format that he or she wishes to receive the object. Still other ways of controlling the format selection module 702 can be used. Other techniques can combine or more of the modes described above.

A.3. Object and Item Consumption

Having created an object, a user can copy the object and insert it into one or more hosts. As mentioned, a host can include a network-accessible page (e.g., a web page), a network-accessible journal (e.g., a blog), a functional module (e.g., a widget), a document of any type, a message (e.g., an Email message, an IM message, etc.), and so on. In one case, the user can insert or embed the object into the host by copying the HTML instructions associated with the object into the HTML instructions associated with the host. In other cases, the object and/or the host can be expressed in alternative formats, in which case the embedding operation is performed in a different manner.

Figure 8:
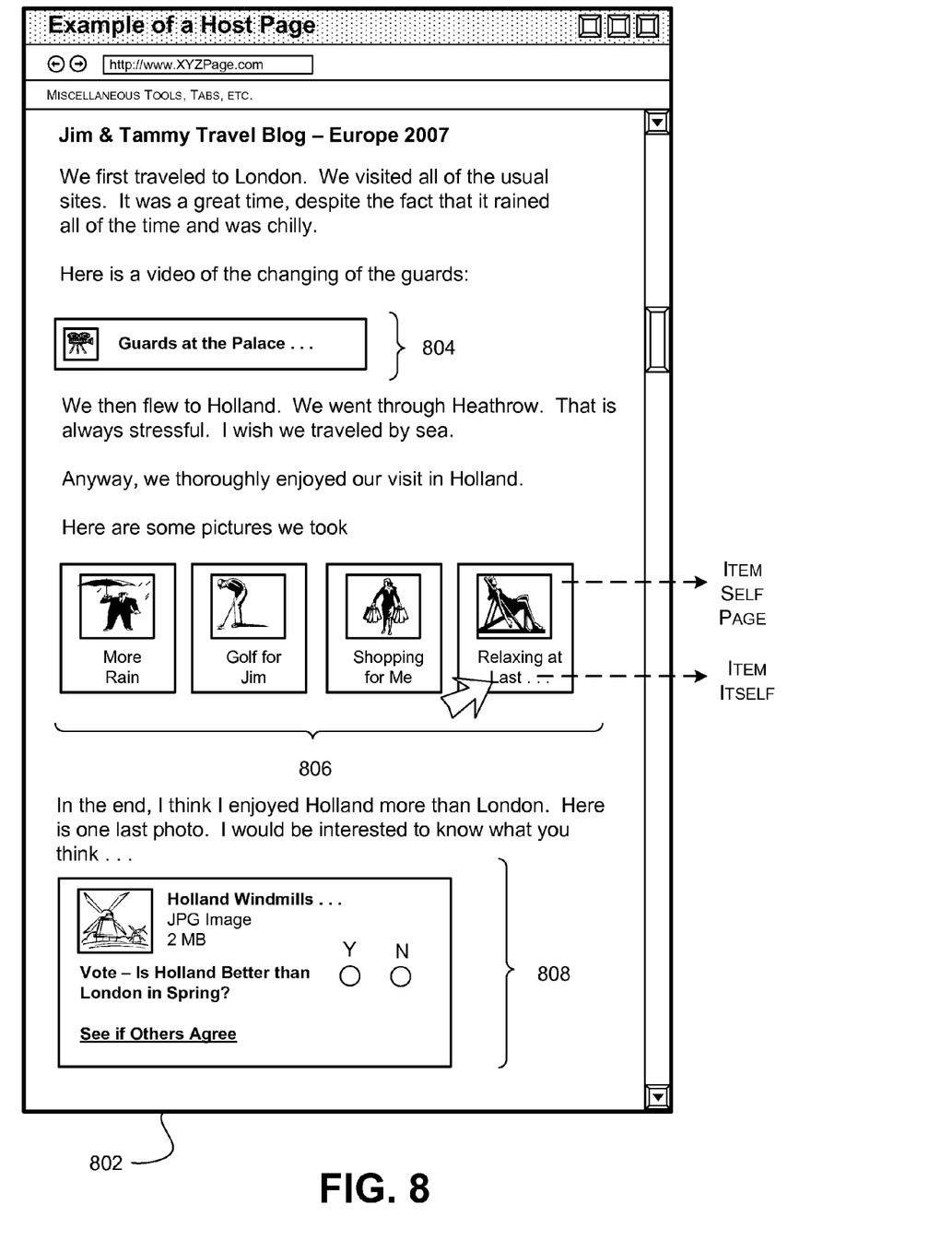
FIG. 8 shows an illustrative host page that embeds a variety of different types of objects, where the objects can be activated by a consumer to access information associated with the linked items.

FIG. 8 shows an illustrative host page 802. The host page 802 corresponds to a network-accessible journal, e.g., a blog describing the travels of a couple. The host page 802 includes several different types of objects that make reference to respective different items. A first object 804 that is encountered corresponds to a video item, e.g., a video taken by the couple while on vacation. The first object 804 has the most abbreviated format of the three formats shown in the item embed page 302 of FIG. 3. A second series of objects 806 corresponds to respective image items, e.g., digital photographs taken by the couple while on vacation. The second objects 806 correspond to the intermediary form of presentation shown in the item embed page 302 of FIG. 3; each these items includes a thumbnail representation of the image item and the title of the image item. A third object 808 corresponds to another image item. This object 808 includes the same interactive format introduced in the context of FIG. 5, giving the consumer of the blog the option of voting on whether Holland is superior to London in the springtime.

A user can activate any of the objects to retrieve information associated with the item represented by the object. More specifically, when the user activates a first control field of an object, the image retrieval module 128 retrieves the item itself. When the user activates a second control field of the object, the image retrieval module 128 retrieves the item's self page, which may include supplemental information regarding the object (comments, tags, etc.) in addition to the item itself. Finally, the user can interact with the interactive object 808 without actually accessing the item or the item's self page. The item can be retrieved from the item store 120, from a cache store (e.g., associated with the object-utilizing system 104), or from some other source or sources. In one case, a user device may have already received the item as part of the host.

Figures 9, 10:
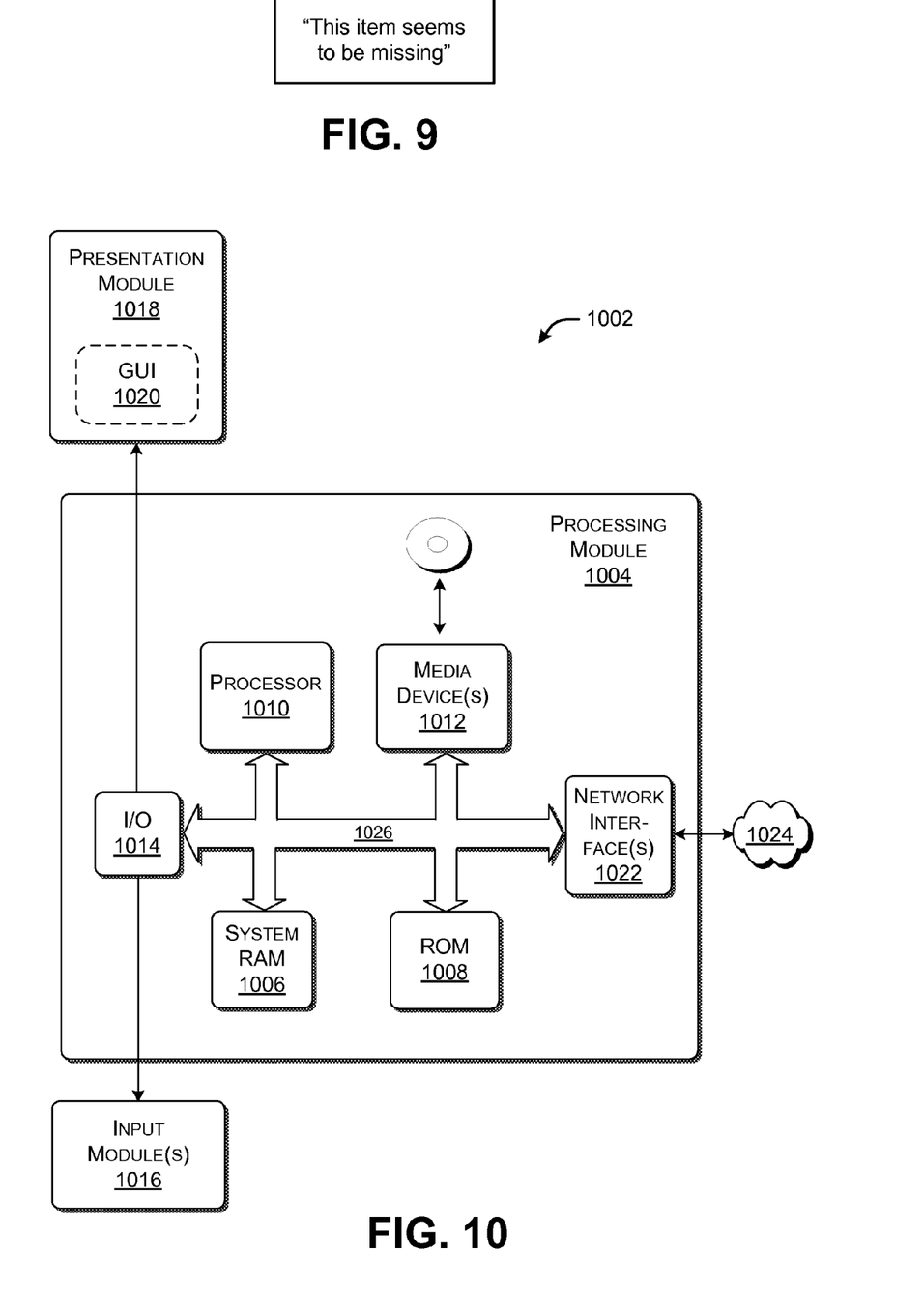
FIG. 9 shows an illustrative object that is operative to display a message to inform a consumer of a failure to access an item associated with the object.
FIG. 10 shows illustrative processing functionality that can be used to implement any aspect of the system of FIG. 1.

In some circumstances, the item retrieval module 128 is not successful in retrieving the item when the user activates an object. One reason for this failure is because the item has been removed from the item store 120 or is otherwise inaccessible for any reason. To address this situation, the item retrieval module 128 can display a message that alerts the user to the failure to retrieve the item. For instance, the item retrieval module 128 can change the visual appearance of the object itself to display an error message, such as "This item appears to be missing," or the like.

A.4. Illustrative Processing Functionality

FIG. 10 sets forth illustrative processing functionality 1002 that can be used to implement any aspect of system 100 shown in FIG. 1. In one non-limiting case, for instance, the processing functionality 1002 may represent any computer machine used by the system 100, e.g., to implement any aspect of a server-side computer (associated with the storage management system 102, and/or the object-utilizing system 104, etc.), to implement any aspect of any user device, and so on.

The processing functionality 1002 can include a processing module 1004 for implementing various processing functions. The processing module 1004 can include volatile and non-volatile memory, such as RAM 1006 and ROM 1008, as well as one or more processors 1010. The processing functionality 1002 can perform various operations identified above when the processor(s) 1010 executes instructions that are maintained by memory (e.g., 1006, 1008, or elsewhere). The processing functionality 1002 also optionally includes various media devices 1012, such as a hard disk module, an optical disk module, and so forth.

The processing functionality 1002 also includes an input/output module 1014 for receiving various inputs from the user (via input modules 1016), and for providing various outputs to the user (via output modules). One particular output mechanism may include a presentation module 1018 and an associated graphical user interface (GUI) 1020. The processing functionality 1002 can also include one or more network interfaces 1022 for exchanging data with other devices via one or more communication conduits 1024. One or more communication buses 1026 communicatively couple the above-described components together.

B. Illustrative Procedures

Figure 11:
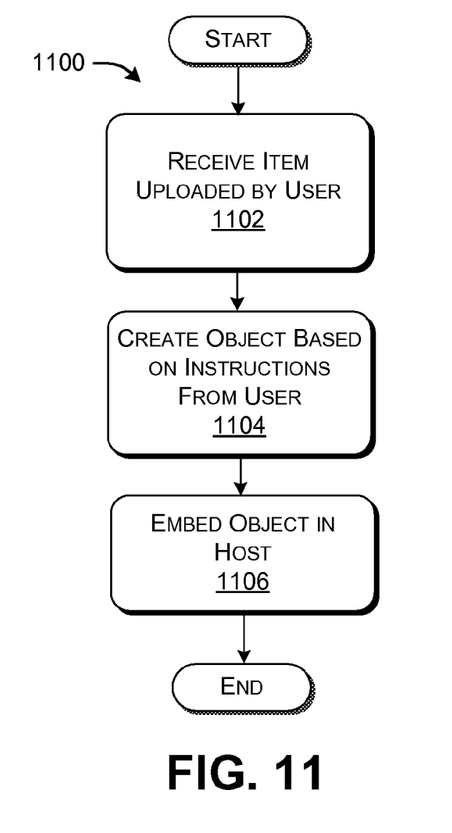
FIG. 11 is a flowchart that shows an illustrative procedure for creating an object and embedding the object in a host.
Figure 12:
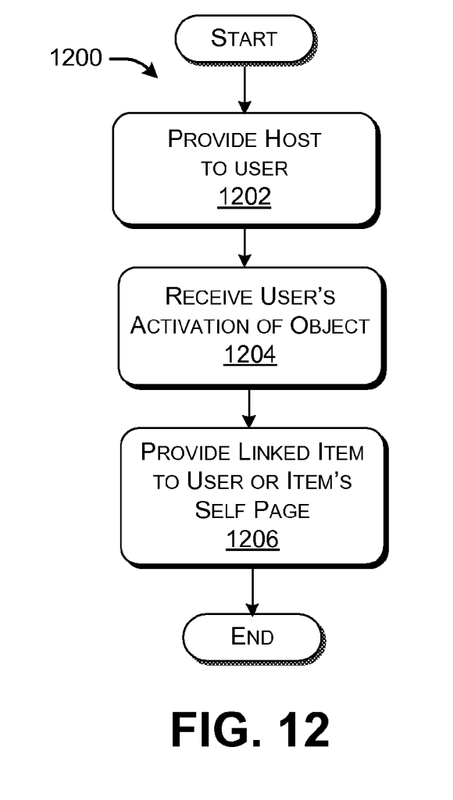
FIG. 12 is a flowchart that shows an illustrative procedure for activating the object (created in FIG. 11), to thereby retrieve information associated with the linked item.

FIGS. 11 and 12 show procedures which explain the operation of the system 100 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth in Section A, Section B serves principally as a review of those functions.

B.1. Object Creation

FIG. 11 is a flowchart that shows a procedure 1100 for creating an object. The object represents an item.

In operation 1102, the storage management system 102 receives an item that has been uploaded by a user. The storage management system 102 stores the item in its item store 120. The item can also (or alternatively) be stored elsewhere, such as in another storage system (e.g., 116), and/or in a cache store, and/or in the user device itself, etc.

In operation 1104, the object creation module 122 creates an object that represents the item, as directed by the user (or a different user). The user can create an item by accessing and copying embedding information from an item self page. Or the user can create an item by accessing an item embed page, selecting a desired layout of the object, and copying the accompanying embedding information. Or the user can construct the object in piecemeal fashion by selecting each of its various characteristics (in the manner shown in FIG. 6). Still other ways of creating an object can be used.

In operation 1106, the object-utilizing system 104 or some other functionality in FIG. 1 allows the user (or a different user) to embed the created object into a host. In one case, this can be performed by copying the embedding information into the markup description of the host.

B.2. Accessing an Item from an Object Embedded in a Host

FIG. 12 is a flowchart that shows a procedure 1200 for accessing information regarding an item by activating a corresponding object in a host.

In operation 1202, the object-utilizing system 104 provides a host to a consumer, e.g., in response to the consumer requested a network-accessible page, etc. In another case, the system 100 can provide a host to a user without accessing network resources, such as in the case in which a user embeds an object in a document and then provides that document to the consumer.

In operation 1204, the item retrieval module 128 receives the consumer's activation of an object within the accessed host. This may correspond to receiving a network request that is invoked when the user activates the object.

In operation 1206, the item retrieval module 128 provides information regarding the item that is associated with the activated object. As explained above, the item retrieval module can provide the item itself or the item's self-page, among other possible retrieval options. The item information can be retrieved from the item store 120 and/or elsewhere.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for creating a representation of an item and using the representation of the item to present the item, comprising:
    employing a processor that executes instructions retained in a computer-memory, the instructions when executed by the processor implement at least the following operations:
        storing a plurality of items, an individual item including a respective file-type of a plurality of file-types;
        receiving, over a network and from a user device, an item selection indicative of a selected item from the plurality of items, the selected item including a file-type of the plurality of file-types;
        providing, over the network and to the user device, a user interface for creating, based at least in part on the file-type, an object to represent the selected item, wherein the user interface includes a plurality of characteristics for creating the object and embedding information for embedding the object in a host;
        receiving, over the network and from the user device, one or more selections received via the user interface, the one or more selections indicative of individual characteristics of the plurality of characteristics for creating the object that represents the selected item;

creating the object that represents the selected item based at least on the one or more selections;

providing the user device with the embedding information, the embedding information including instructions to display the object within the host;

receiving an activation of the object based at least in part on an appearance of the object within the host; and presenting, in response to the activation of the object, the selected item using a player that is configured to present the file-type of the selected item.

2. The method of claim 1, wherein the file-type includes an image file, a text file, a spreadsheet file, an audio file, or a video file.

3. The method 1, wherein one or more characteristics of the plurality of characteristics allow customization of visual characteristics of the object.

4. The method of claim 1, wherein one or more characteristics of the plurality of characteristics allow customization of a collection of metadata that is provided by the object.

5. The method of claim 1, wherein one or more characteristics of the plurality of characteristics allow specification of a plurality of formats of the object, wherein individual formats within the plurality of formats correspond to different display configurations of the object for different devices configured to receive and display the object.

6. The method of claim 1, wherein the object that is created includes at least one interactive feature that is operative to solicit information from a consumer.

7. The method of claim 6, wherein the interactive feature is operative to receive an evaluation of the object from the consumer.

8. The method of claim 6, wherein the interactive feature is operative to receive a comment from the consumer.

9. The method of claim 1, wherein the object includes at least one dynamic field that changes in response to events that occur subsequent to the embedding of the object in the host.

10. The method of claim 1, wherein the host is one of:
a network-accessible page;
a network-accessible journal;
a message;
a document; or
a functional module.

11. The method of claim 1, wherein the object includes two fields, wherein a first field is a control to present the selected item itself and a second field is a control to access supplemental information associated with the selected item.

12. The method of claim 1, further comprising:
receiving, over the network and from the user device, one or more additional selections, the one or more additional selections indicative of individual characteristics of the plurality of characteristics for creating an additional object that represents the selected item; and
creating an additional object that represents the selected object.

13. The method of claim 1, further comprising storing a plurality of players, an individual player of the plurality of players configured to present an individual file-type of the plurality of file-types.

14. A computing device comprising:
one or more processors; and
one or more computer-readable storage media in communication with the one or more processors, the one or more computer-readable storage media storing computer readable instructions that, when executed by the one or more processors, perform operations comprising:
identifying an item previously uploaded to a store, wherein the item is selected from a plurality of items and includes an item type from a plurality of item types;
providing, over a network and to a user device, an embed interface, wherein the embed interface includes a plurality of options for creating a custom representation of the item in the form of an object;
receiving, over the network and from the user device, a selection from among the plurality of options to create the object;
creating, based at least in part on the selection, the object;
providing, over the network and to the user device, embedding information for embedding the object in a host, the embedding information including instructions to display the object within the host; and
presenting, using a player that is configured to present the item type of the item, the item in response to the object being activated within the host.

15. The computing device of claim 14, wherein the embed interface further includes an item self page that presents information about the item, and wherein the information about the item includes at least one of the item type, a time at which the item was uploaded to the store, a size of the item, and a network address for the item.

16. The computing device of claim 14, wherein the embed interface further includes an image embed page that presents a plurality of appearance options for the object, and wherein each of the plurality of appearance options presents how the object will appear on the host.

17. The computing device of claim 14, the operations further comprising storing a plurality of players, an individual player of the plurality of players configured to present an individual item type of the plurality of item types.

18. A computing device comprising:
one or more processors; and
one or more computer-readable storage media in communication with the one or more processors, the one or more computer-readable storage media storing computer readable instructions that, when executed by the one or more processors, perform operations comprising:
storing a plurality of items uploaded into a store, wherein the plurality of items include different respective item types;
providing a user interface for creating customizable objects that represent at least a portion of the plurality of items, the user interface including characteristics for creating the customizable objects that represent the at least the portion of the plurality of items;
receiving one or more selections via the user interface, the one or more selections indicative of individual characteristics from the characteristics for creating the customizable objects that represent the at least the portion of the plurality of items;
creating the customizable objects that represent the at least the portion of the plurality of items based at least in part on the one or more selections, wherein the customizable objects serve as controls for retrieving the at least the portion of the plurality of items based at least in part on activation within hosts in which the customizable objects appear;

providing one or more user devices with embedding information for embedding the customizable objects in the hosts, the embedding information including instructions to display the customizable objects within the hosts; and presenting the at least the portion of the plurality of items in response to the customizable objects associated with the at least the portion of the plurality of items being activated via the one or more user devices, wherein logic for presenting the at least the portion of the plurality of items applies different players for different respective item types associated with the customizable objects that are activated.

19. A method for creating a representation of an item and using the representation of the item to present the item, comprising:

employing a processor that executes instructions retained in a computer-memory, the instructions when executed by the processor implement at least the following operations:

receiving, over a network and from a user device, an item selection, the item selection indicative of a selected item uploaded to a store and stored therein, the store having a plurality of items with different respective item types stored therein;

providing, over the network and to the user device, a user interface for creating, based at least in part on an item type of the selected item, an object to represent the selected item, wherein the user interface includes a plurality of characteristics for creating the object;

receiving, over the network and from the user device, one or more selections received via the user interface, the one or more selections indicative of individual characteristics of the plurality of characteristics for creating the object that represents the selected item;

creating the object that represents the selected item based at least on the one or more selections, wherein the object includes a plurality of formats and individual formats within the plurality of formats correspond to different display configurations of the object for different devices configured to receive and display the object;

providing, over the network and to the user device, embedding information for embedding the object in a host, the embedding information including instructions to display the object within the host, wherein the embedding instructions are at least partially based on the plurality of formats associated with the object; and presenting, in response to an activation of the object, the selected item using a player that is configured to present the file type of the selected item.

20. The method of claim 19, further comprising storing a plurality of players, an individual player of the plurality of players configured to present an individual item type of the different respective item types.

* * * * *